United States Patent
Bean

(10) Patent No.: US 7,353,780 B2
(45) Date of Patent: Apr. 8, 2008

(54) EXTENSIBLE ANIMAL LEASH WITH EXPONENTIALLY-INCREASING RESTRAINT AND INCREMENTAL WEIGHT THEREFOR

(76) Inventor: Normand Bean, 194 Little Paradise Road, Apt. #1, St-Bernard, Nova Scotia (CA) B0W 3T0

(*) Notice: Subject to any disclaimer, the term of this patent is extended or adjusted under 35 U.S.C. 154(b) by 151 days.

(21) Appl. No.: 11/300,370

(22) Filed: Dec. 15, 2005

(65) Prior Publication Data

US 2007/0137588 A1    Jun. 21, 2007

(51) Int. Cl.
  *A01K 15/02*    (2006.01)
  *A01K 27/00*    (2006.01)
(52) U.S. Cl. ........................ 119/786; 119/789
(58) Field of Classification Search ............... 119/702, 119/708, 712, 769, 782, 784, 791, 786–789; 482/93, 94, 97–103, 110, 106–108, 99, 133–139, 482/98, 148, 109; 473/256, 437; 16/128, 16/DIG. 8; 248/910, 364; 102/434, 438, 102/503; 47/44, 47
See application file for complete search history.

(56) References Cited

U.S. PATENT DOCUMENTS

| | | | |
|---|---|---|---|
| 124,532 A | 3/1872 | Barnard | |
| 167,263 A | 8/1875 | Maguire | |
| 183,677 A | 10/1876 | Jackson | |
| 215,730 A | 5/1879 | Fox et al. | |
| 550,620 A | 12/1895 | Jones | |
| 750,141 A | 1/1904 | Willey | |
| 757,882 A | 4/1904 | Butterworth | |
| 848,272 A | 3/1907 | Thornley | |
| 2,725,853 A | 12/1955 | Nordheim | |
| 3,189,004 A | 6/1965 | Sinclair | |
| 4,107,989 A | 8/1978 | Peters | |
| 4,218,057 A * | 8/1980 | Wilson | 482/93 |
| 4,480,828 A * | 11/1984 | Kifferstein | 482/74 |
| 4,593,903 A * | 6/1986 | Waitz | 482/93 |
| 4,747,372 A | 5/1988 | Terry et al. | |
| 5,154,271 A | 10/1992 | Binzen | |
| 5,158,517 A | 10/1992 | Steggert | |
| 5,192,075 A * | 3/1993 | Ashihara | 463/47.4 |
| 5,312,314 A * | 5/1994 | Stephan et al. | 482/110 |
| 5,628,713 A * | 5/1997 | Wilkinson | 482/74 |

(Continued)

FOREIGN PATENT DOCUMENTS

DE    3217426 A1 * 11/1983

(Continued)

*Primary Examiner*—Son T. Nguyen
(74) *Attorney, Agent, or Firm*—Mario Theriault

(57) ABSTRACT

The extensible leash system comprises a rope and a leash extending from the rope. A weight system including an incremental weight device is suspended to the rope and has a first, second, third and fourth weights mounted therein. There is also provided a mechanism for raising the first, second, third and fourth weights with the rope in sequence according to a first distance interval along the rope between the first and second weights, according to a second distance interval along the rope between the second and third weights, and according to a third distance interval along the rope between the third and fourth weights, wherein a relation between the weight extents of the first, second, third and fourth weights, and the first, second and third distance intervals represents an exponential increase in a restraining action on the rope and the leash.

5 Claims, 7 Drawing Sheets

U.S. PATENT DOCUMENTS

| | | |
|---|---|---|
| 6,306,040 B1 * | 10/2001 | Chang ................. 463/47.7 |
| 6,599,222 B2 * | 7/2003 | Wince ................. 482/106 |
| 7,044,858 B1 * | 5/2006 | Otto et al. ............. 463/47.2 |
| 2002/0066417 A1 | 6/2002 | Frazer et al. |
| 2004/0009854 A1 | 1/2004 | Shiang et al. |
| 2004/0132590 A1 * | 7/2004 | Papas ................. 482/109 |

FOREIGN PATENT DOCUMENTS

GB  2084843 A  *  4/1982

* cited by examiner

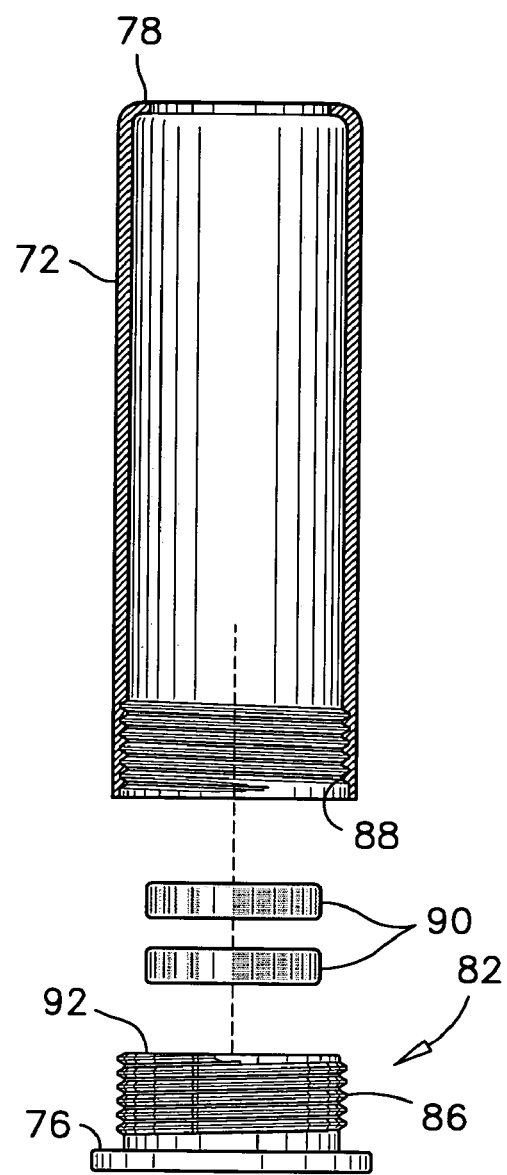
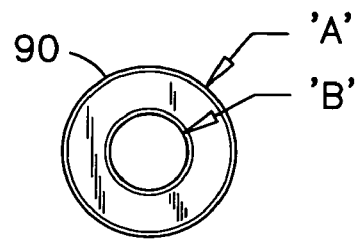
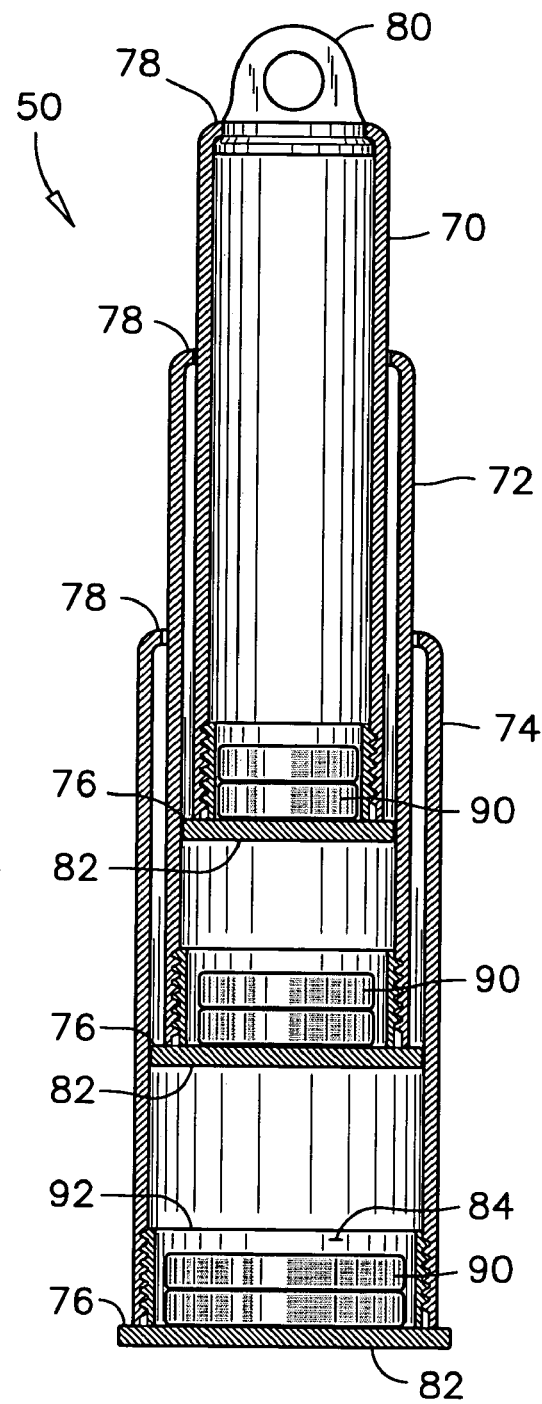
FIG. 2
FIG. 4
FIG. 3

EXTENSIBLE ANIMAL LEASH WITH EXPONENTIALLY-INCREASING RESTRAINT AND INCREMENTAL WEIGHT THEREFOR

FIELD OF THE INVENTION

This invention pertains to tethering devices, and more particularly it pertains to an extensible animal leash having its secured end attached to an incrementally-increasing weight system.

BACKGROUND OF THE INVENTION

There are several reasons for keeping an animal leash under a slight tension at all times. First, an animal tied to a leash in a backyard for example, moves around and back and forth within the leash's range. When the leash has slack segments in it, it tends to become entangled around its support structure and around nearby objects. More important, the leash can become entangled around one of the animal's legs or other body part, and can entrap the animal in a precarious position for long periods of time. A slight tension in the leash keeps it free of knots and snares. A second reason for keeping an animal leash under a slight tension is to lessen the impact of a tight-leash stop on the animal's collar.

In the past, several devices were developed to apply a slight tension on a leash or on other tethering cords used for retaining horses, boats and even for preventing a child from wandering away from a supervised playground.

Examples of these prior art devices are described in the following U.S. patents. These documents are divided in three groups. The documents in the first group describe tethering cords passing over a sheave or a similar rope guide mounted in a vertical support structure. In each case, a single weight is suspended to the cord inside the vertical structure. As the cord is pulled away from the vertical structure, the weight is lifted, thereby applying a tension on the cord. This first arrangement is described in the following patents.

U.S. Pat. No. 124,532 issued to C. F. Barnard on Mar. 12, 1872;
U.S. Pat. No. 167,263 issued to T. Maguire on Aug. 31, 1875;
U.S. Pat. No. 183,677 issued to J. L. Jackson on Oct. 24, 1876;
U.S. Pat. No. 750,141 issued to W. J. Willey on Jan. 19, 1904.

One improvement to the above-described arrangement has been to incorporate a compression spring around the cord, between the rope guide and the weight, to absorb the impact of the weight reaching the end of its travel. This type of tethering device is illustrated in the following documents:
U.S. Pat. No. 757,882 issued to T. C. Butterworth on Apr. 19, 1904;
U.S. Pat. No. 3,189,004 issued to F. Sinclair on Jun. 15, 1965.

In yet another improvement to tethering devices, a mechanical advantage has been introduced in the restrainer portion of each device. A pulley block is attached to the weight and the cord forms a loop that is threaded into the pulley block with its fixed end tied to the upper end of the vertical structure. The weight is thereby suspended to two segments of the cord whereby the total cord extension is twice as long as the weight's travel distance along the vertical structure. This type of tethering device is illustrated in the following patents;

U.S. Pat. No. 215,730 issued to J. A. Fox et al. on May 27, 1879.
U.S. Pat. No. 550,620 issued to J. C. Jones on Dec. 3, 1895;
U.S. Pat. No. 2,725,853 issued to J. Nordheim on Dec. 6, 1955;
U.S. Pat. No. 4,747,372 issued to M. Terry et al. on May 31, 1988.

The system described in U.S. Pat. No. 550,620 in particular, differs slightly from the other devices in the latter group because it has two loops in series along the cord and two weight-and-block arrangements respectively mounted in these loops. One of the weights is heavier than the other, and is lifted last for increasing the pulling resistance on the cord incrementally.

It is believed that when one discrete change in tension is applied to a tether rope at a specific location, or when two changes in tension are applied to a tether rope at a fixed distance interval between each other, an animal can learn the locations where the tension increases in the rope along the rope's range. An animal tied to the rope can thereby anticipate and get accustomed to these changes in tension, and can still run to the end of the rope with considerable momentum.

Although the tethering devices of the prior art deserve undeniable merits, it is believed that a need still exists for a tethering device which is more efficient than the prior art installations for dissuading an animal from attempting to reach the end of its leash.

SUMMARY OF THE INVENTION

In the present invention, however, there is provided an incremental weight device that can be used for increasing the pulling resistance on a leash in an incremental and irregular manner, and for transmitting authoritative commands to the animal being restrained. Also, it has been found that such incremental and irregular additions of weights to the leash can prevent an animal from anticipating the increases in tension.

Unexpected advantages of the present invention are more apparent and better explained when the incremental weight device is described in an animal leash environment. Accordingly, in a first aspect of the present invention, there is provided an extensible leash system comprising a rope and a leash extending from this rope. A weight system is suspended to the rope. The weight system has a first, second and third weights mounted therein. There is also provided a mechanism for raising the first, second and third weights in sequence according to a first distance interval along the rope between the first and second weights, and according to a second distance interval along the rope between the second and third weights, wherein the second distance interval is shorter than the first distance interval.

Because the application of the third weight to the leash is effected at a shorter distance interval than the second weight, the restraining action applied to the leash transmits a command of firmness to the restrained animal to better dissuade the animal from pulling further.

In another aspect of the present invention, there is provided a fourth weight in the weight system. The aforesaid mechanism has means for raising the fourth weight in sequence according to a third distance interval along the rope between the third and fourth weights. The third distance interval is similar to the second distance interval, and a sum of the second and third distance intervals is less than the first distance interval.

In yet another aspect of the present invention, the weight extents of the first, second, third and fourth weights in relation with the first, second and third distance intervals represent an exponential increase of a restraining action on the rope and the leash.

Again, the exponential application of weights to the leash near the end of the leash's range provides a stronger command of firmness and determination to the restrained animal to further dissuade the more stubborn animals from pulling on the leash.

Still another feature of the leash system according to the present invention is that it is susceptible of a low cost of manufacture with regard to both materials and labour, and which accordingly is then susceptible of low prices of sale to the consumer, thereby making such leash system economically available to the public.

It yet a further aspect of the present invention, the incremental weight device, in its most basic form, is described as follows. The incremental weight device comprises a plurality of tubular sections of different sizes telescopically mounted inside each other. These tubular sections are extensible from within each other. Each of the tubular sections has an upper end, a lower end, a cylindrical surface, and a circular shoulder on its lower end protruding from its cylindrical surface. The smallest tubular section has an eyelet on its upper end. Each of the tubular sections has on its upper end, a circular lip extending inward relative to its cylindrical surface. Each of the lips has a dimension to interfere with the shoulder on the next smaller tubular section for preventing separation of the tubular sections from each other when they are extended relative to each other.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

Two embodiments of the present invention are illustrated in the accompanying drawings, in which like numerals denote like parts throughout the several views, and in which:

FIG. 2 is a cross-section and exploded view of one of the telescopic sections mounted in the incremental weight device comprised in the preferred leash system;

FIG. 3 is a cross-section view of the incremental weight device comprised in the preferred leash system;

FIG. 4 is a plan view of one of the load units included in the incremental weight device;

DESCRIPTION OF THE PREFERRED EMBODIMENTS

Figure 1:
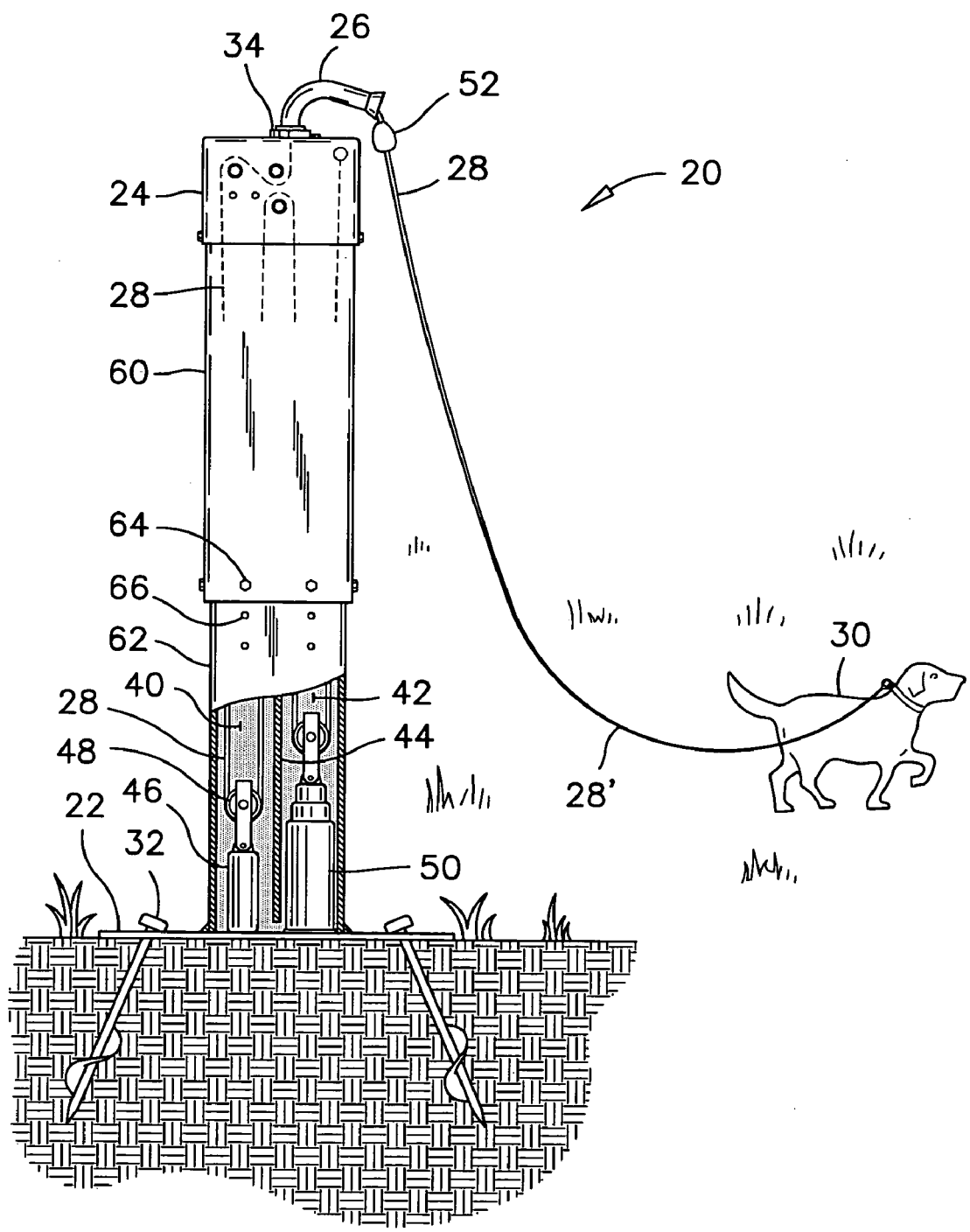
FIG. 1 is a partial cutaway view of a column comprised in the leash system according a first preferred embodiment of the present invention.

While the incremental weight device according to the present invention is susceptible of embodiment in many different forms, there are shown in the drawings and will be described in details herein two specific embodiments, with the understanding that the present disclosure is to be considered as an example of the principles of the invention and is not intended to limit the invention to the embodiments illustrated and described. The incremental weight device is first described and illustrated in FIGS. 1-10 in an animal leash environment. A second preferred embodiment describes the incremental weigh device mounted in an exercising apparatus. This second preferred embodiment is illustrated in FIG. 11.

Referring to FIG. 1, the preferred leash tensioning system will be described broadly. The preferred leash tensioning system comprises a hollow column 20 having a base plate 22, a cap 24 and a conduit 26 on the cap. A rope 28 extends from that conduit 26 and extends into, constitutes, or is connected to, a leash 28' to which an animal, such as a dog 30 can be attached.

The base plate 22 is preferably held to the ground by anchor bolts 32 as illustrated, by one or more sand bags or by other ballast material or object.

The conduit 26 is preferably affixed to the cap 24 by means of a swivel joint 34 to allow the conduit 26 to rotate about a vertical axis.

The hollow column 20 has two vertical compartments 40, 42 therein separated by a partition 44. A first weight 46 is mounted in the first compartment 40 and is engaged to the rope 28 by means of a first pulley block 48. A second weight 50 is mounted in the second compartment 42 and is also engaged to the rope 28 by means of a second pulley block 48. The cap 24 encloses a pulley system therein through which the rope is threaded.

A stopper 52 is preferably installed on the rope 28 adjacent to the conduit 26 when the weights 46, 50 are at rest on the base plate 22. The stopper 52 prevents the rope 28 from taking some slack inside the column 20 and from disengaging from the pulley system.

Preferably, the column 20 is made of two separate longitudinal sections. An upper section 60 is telescopically engaged over, and movable along, a base section 62, to adjust the height of the column 20 and to satisfy certain installation conditions. The adjustment of the height of the column 20 is preferably effected by means of bolts 64 or pins extending through the wall of the upper section 60 and into a corresponding set of holes 66 in the base section 62.

Although a dog is mentioned herein and is illustrated in FIG. 1, the leash system according to the present invention can be made to accommodate other animals such as a horse or a variety of zoo animals. The leash system can also be reduced in size and used indoors, with a ballast ring on its base, to retain a cat or a hamster for example.

Referring now to FIGS. 2-4, the preferred structure of the second weight 50 will be described. The second weight 50 is also referred to herein as the incremental weight device according to the present invention because its general arrangement and variations represent the main focus of the present invention.

The incremental weight device 50 according to the first preferred arrangement has a telescopic structure which is made of three tubular sections 70, 72, 74 with each section sliding into a larger one such as a telescope. The second weight 50 is also referred to herein as the incremental weight device because it is made of different weights that are added to each other as the telescopic structure thereof is extended.

Each section 70, 72 or 74 has an outside circular shoulder 76 on its lower end and an inside circular lip 78 on its upper end. The shoulder 76 of one section engages with the lip 78 of the next larger section to retain the sections 70, 72 inside the section 74. The smaller section 70 has a eyelet 80 on its upper end, to which can be fastened a pulley block 48.

Each tubular section 70, 72 or 74 has a plug 82 on its lower end. The projection around the base of this plug 82 constitutes the aforesaid shoulder 76. When the plug 82 on one section is removed, the opening in the lower end of that section is wide enough to accept the next-smaller tubular section there through with its plug 82 mounted thereon.

The plug 82 in each section has a hollow portion 84 therein having an outside surface and an outside thread 86 on that outside surface. Each tubular section has a corresponding inside thread 88 on its inside lower portion. In use, the plug 82 is engaged with the inside thread 88. The hollow portion 84 of the plug constitutes a cavity for receiving one or more load units 90. The rim of the hollow portion 84 of each plug also constitutes a stopper 92 on which rests the plug 82 of a smaller tubular section when this telescopic weight 50 is in a collapsed mode.

Although a threaded engagement 86, 88 to retain the plug 82 to a tubular section 70, 72 or 74 is mentioned herein, it will be appreciated that other fastening means can be used to accomplish the same result.

The tubular sections 70, 72, 74 are also referred to herein as the first, second and third telescoping weights. In use, the first section 70 of the three telescoping weights is lifted first. After an initial extension of the first section 70, corresponding substantially to the length of that section, the shoulder 76 on the first section 70 engages with the lip 78 on the second section 72 to entrain the second section 72 in unison. The third section 74 is similarly engaged to the second section 72 following a displacement of the second section 72 relative to the third section 74.

Each load unit 90 has a torus-like shape, a basic thickness, an outside diameter 'A' and an inside diameter 'B'. The outside diameter 'A' is selected such that the load unit fits inside the hollow portion 84 of a particular plug 82. The inside diameter 'B' is determined according to the desired weight extent of a particular load unit 90. In the preferred embodiment of an animal leash system, each tubular section 70, 72 or 74 has a similar weight extent.

It should be noted that the first weight 46 has a similar structure as the first telescoping weight 70. However, the first telescoping weight 70 is heavier than the first weight 46 such that the first weight 46 is lifted first.

The weight extent of the first weight 46 is selected to provide a pull force on the rope 28 which is sufficient to pull back the rope 28 inside the column 20, and to keep the rope 28 relatively taut, but should be insufficient to frustrate an animal walking, standing or laying within the range provided by the displacement of this first weight 46.

The weight extent of the first telescoping weight 70 should be sufficient to hinder the displacement of an animal tied to the leash 28', and the weight extents of the second and third telescoping weights 72, 74 should be such as to make it difficult for the animal to move further. For example, the weight extents of the first, second and third telescoping weights 70, 72, 74 can equal or exceed the weight of the animal to be restrained by the leash system.

The extensions of the sections 70, 72, 74 are preferably of equal lengths. Although three sections 70, 72, 74 are illustrated in the incremental weight device 50, it will be understood that two or more than three sections can be used. The total extension of the incremental weight device 50 is also selected such that it is less than the travel distance of the first weight 46 along the column 20.

The provision of removable plugs 82 on the tubular sections 70, 72, 74 makes it particularly easy to assemble the incremental weight device 50, or to vary the quantity of load units 90 in each section.

Figures 5, 6:
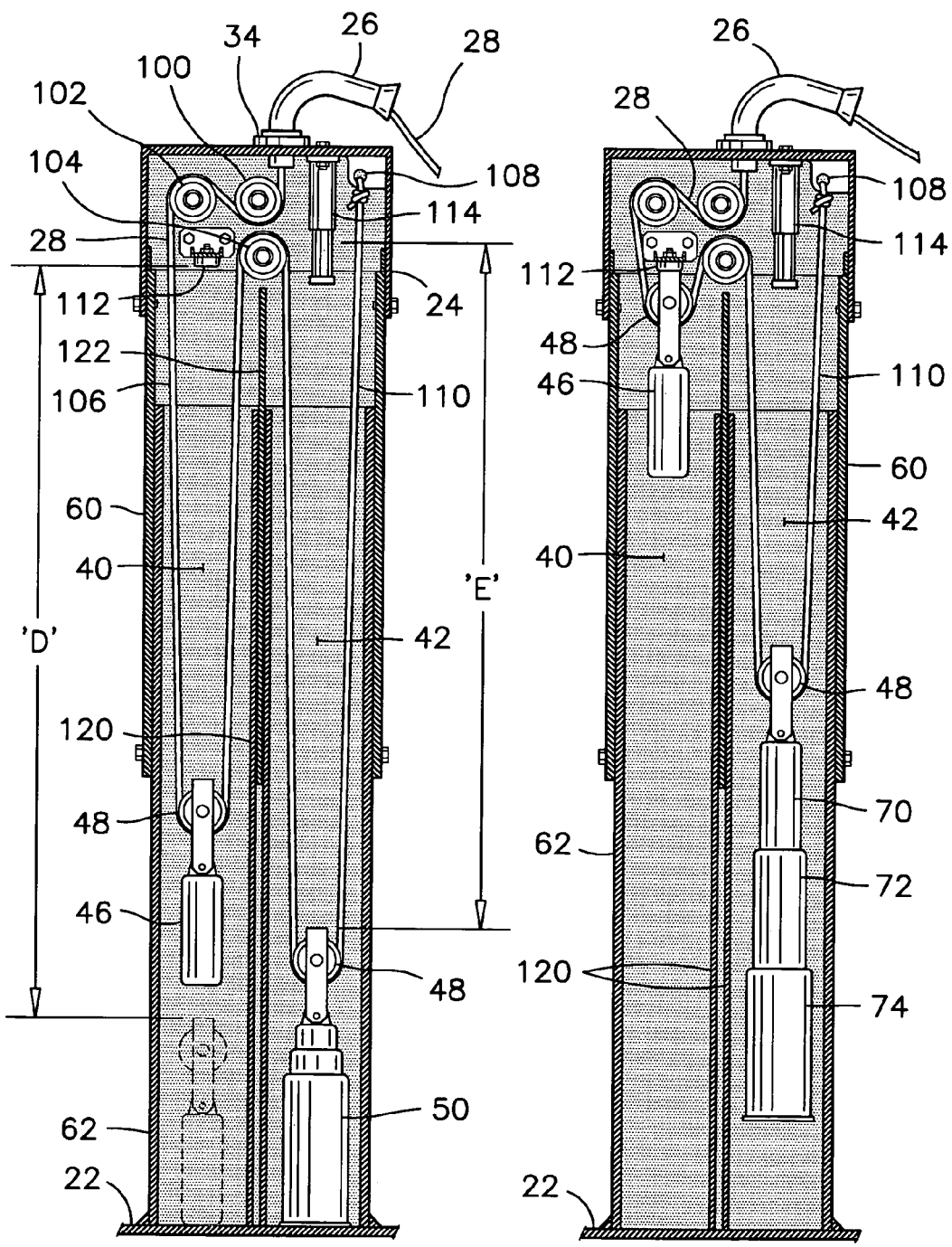
FIGS. 5 and 6 are cross-section views of the column comprised in the preferred leash system, showing the weights therein in two different positions.

Referring now to FIGS. 5 and 6, the operation of the preferred leash system will be described. The rope 28 is guided into the conduit 26 and under an idler pulley 100, inside the cap 24 of the column 20. The rope 28 is suspended to a first and second support sheaves 102, 104 and forms a first loop 106 between the first and second support sheaves 102, 104. This first loop 106 extends into the first compartment 40. The first loop 106 is threaded into the pulley block 48 on the first weight 46.

The rope 28 extends over the second support sheave 104 and has its secured end tied to a holed bracket 108 inside the cap 24 of the column 20. The rope 28 forms a second loop 110 between the second support sheave 104 and the holed bracket 108. The second loop 110 extends down into the second compartment 42, and is threaded into the pulley block 48 on the incremental weight device 50.

In use, when the slack in the leash is pulled tight, and the rope 28 is pulled out of the column 20, the first loop 106 shortens first, thereby lifting the first weight 46 off the base plate 22 and upward along the first compartment 40. A bumper 112 is mounted inside the cap 24, inline with the trajectory of the pulley block 48 on the first weight 46. This bumper 112 limits the upward movement of the first weight 46.

When the first weight 46 reaches its upper limit, at bumper 112, as illustrated in FIG. 6, the tension in the rope 28 causes the second loop 110 to shorten up, thereby pulling the incremental weight device 50 upward. The first section 70 of the incremental weight device 50 extends first and entrains the second and third sections 72, 74 in sequence. When the pulley block 48 on the incremental weight device 50 reaches the cap 24 of the column 20, it comes in contact with a shock absorber 114 that is affixed to the cap 24. The shock absorber 114 further reduces the force of tight-leash impacts on the collar of the restrained animal.

As seen in FIGS. 5 and 6, both compartments 40, 42 are separated by an extensible partition 44. This partition consists of a pair of guide plates 120 affixed to the base section 62 and a central plate 122 affixed to the upper section 60. The central plate 122 is positioned to slide between both guide plates 120.

In installations where the column 20 has a fixed height and is not exposed to difficult environment, this column can be fabricated from a H-beam (not shown) for example, where the web of the beam constitutes the partition 44 and the cap 24 is affixed to the flanges of the beam. In that case, both compartments 40, 42 are exposed to the sides of the column. Also, the column can be fabricated with a pair of round tubing for examples. It will also be appreciated that the column 20 and the weights 46 and 50 can be fabricated with metal or plastic, according to the conditions of use of the leash system.

Figure 7:
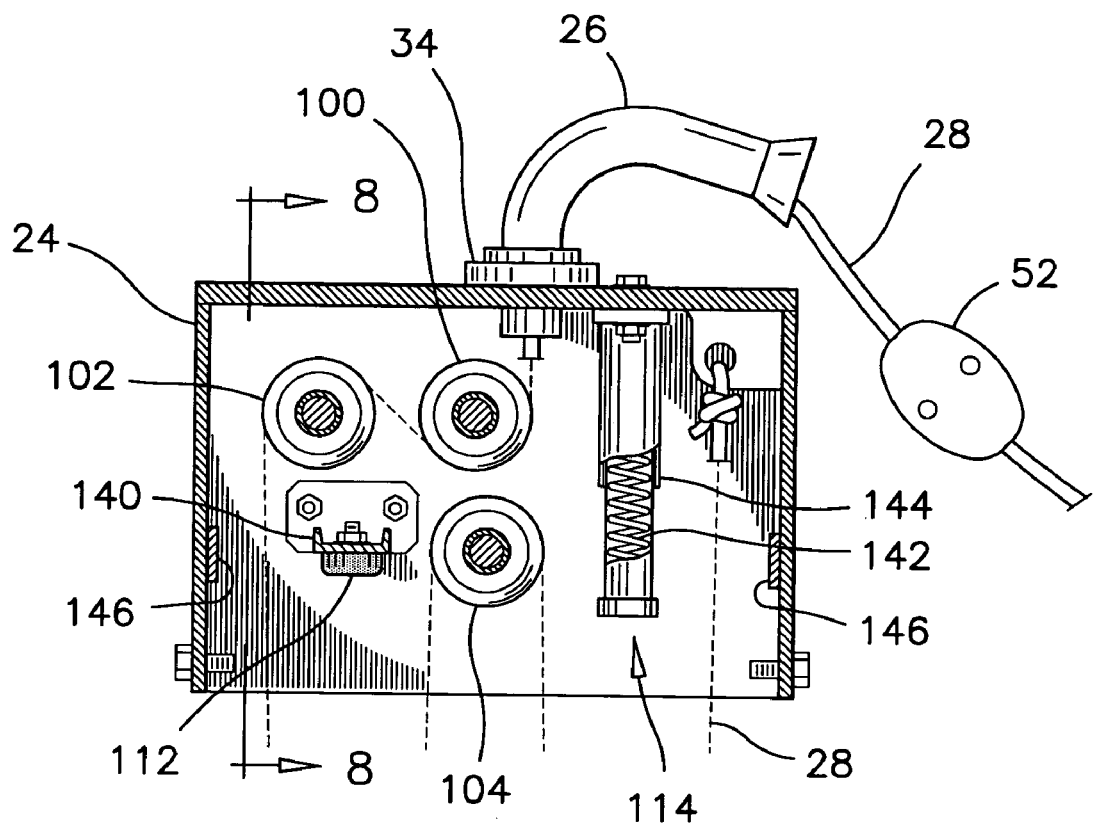
FIG. 7 is an enlarged cross-section view of the cap mounted on the column shown in FIGS. 5 and 6.
Figure 8:
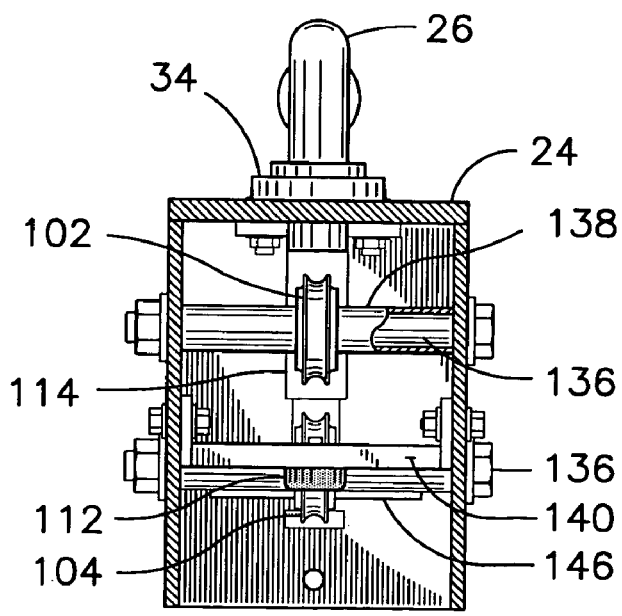
FIG. 8 is a cross-section view of the cap as seen along line 8-8 in FIG. 7.

As mentioned before, the cap 24 encloses the idler pulley 100, the first and second support sheaves 102, 104, the bumper 112 and the shock absorber 114, as illustrated in FIGS. 7 and 8. The idler pulley and sheaves are supported on respective shaft 136 and are kept aligned with each other by means of spacer sleeves 138 mounted on these shafts 136.

The bumper 112 is supported on a structural bar 140 extending across the sides of the cap 24.

The preferred shock absorber 114 comprises a spring 142 that is mounted inside telescoping and guiding sleeves 144, to prevent the spring from buckling. One or more spacers 146 are affixed to the inside walls of the cap 24 to locate the cap over the upper section 60 of the column, and to facilitate the bolting of the cap 24 to the upper section 60. Because the pulley mechanism is mounted inside the cap 24, and the cap is separable from the upper section 60, the entire column 20 is relatively easy to manufacture, to assemble and to maintain.

Figure 9:
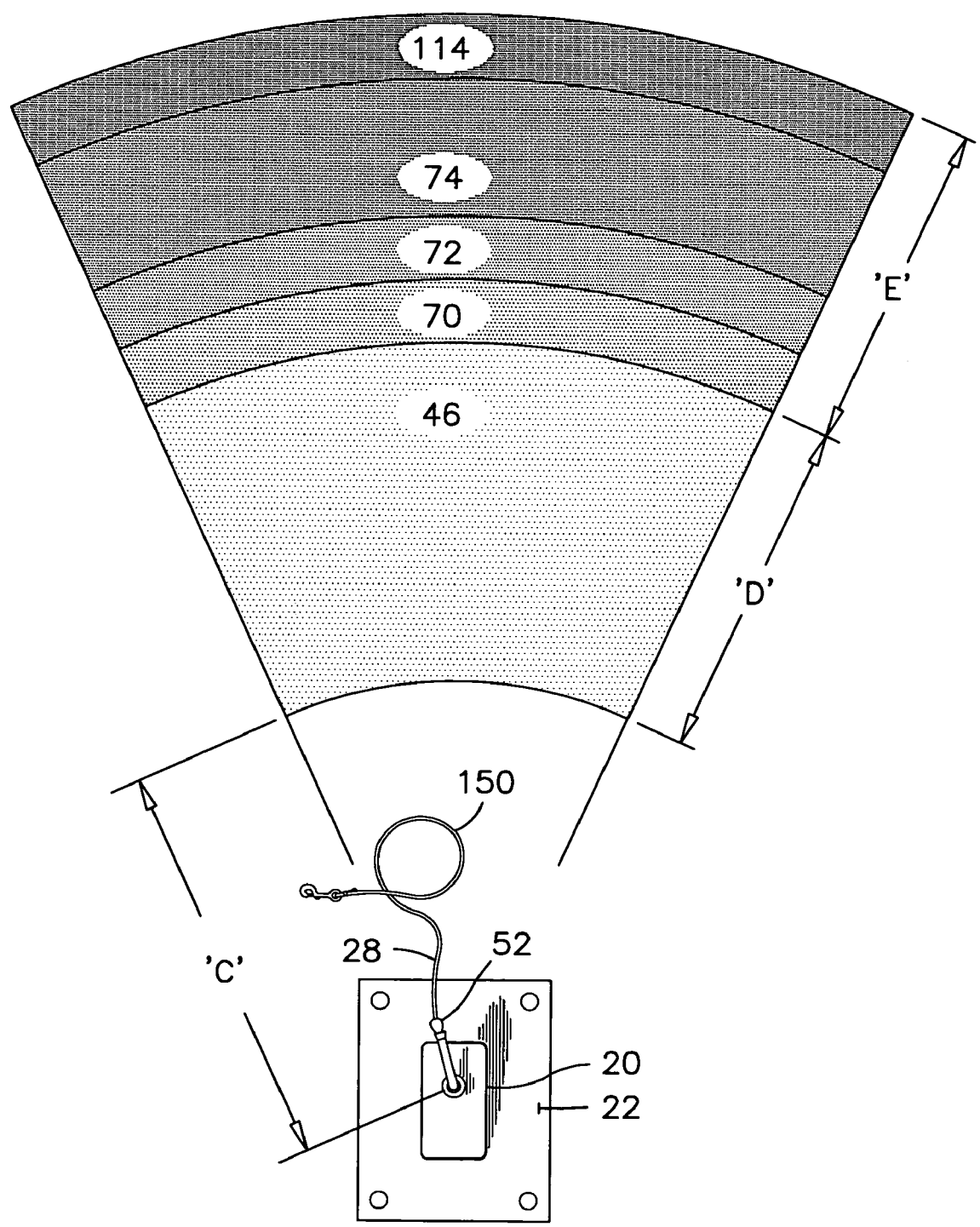
FIG. 9 is a plan view of the preferred leash system showing different shaded areas indicating regions of different tensions in the leash.
Figure 10:
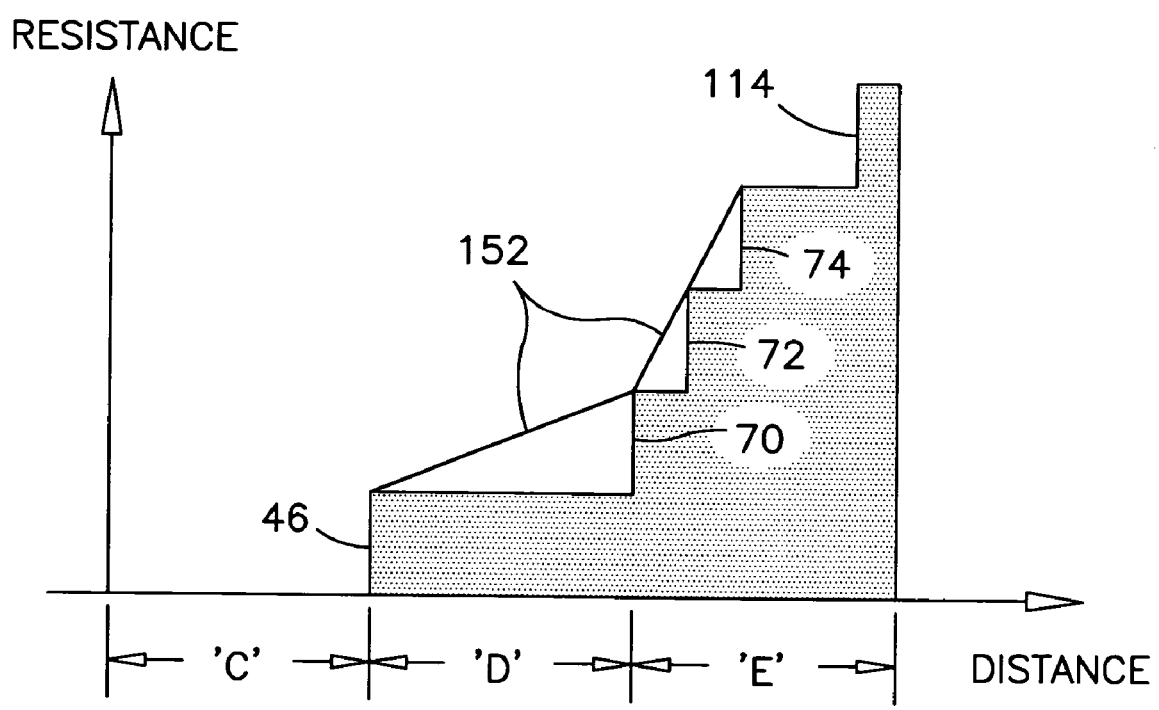
FIG. 10 is a graph showing preferred additions of weights to the secured end of the leash in the preferred leash system.
Figure 11:
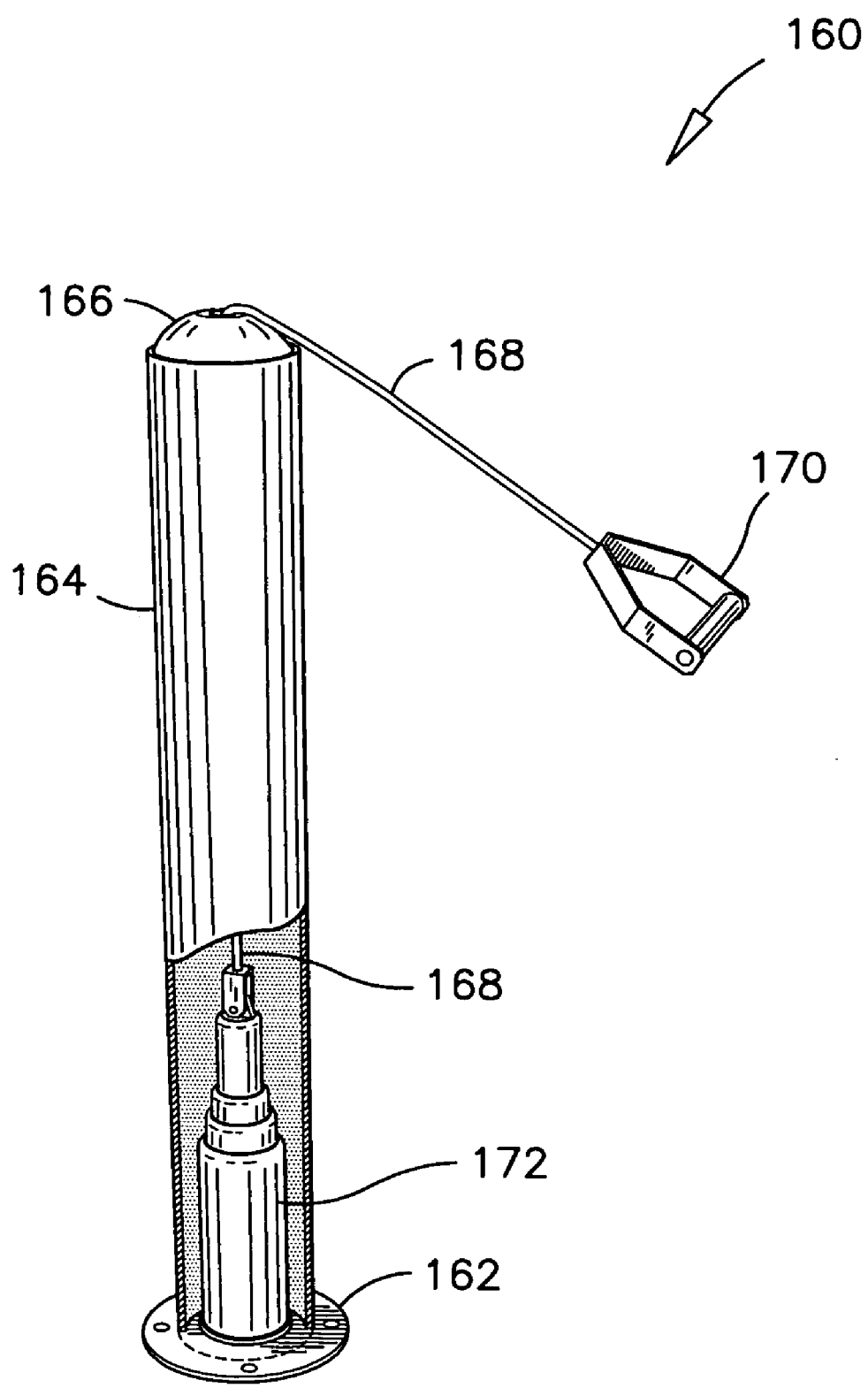
FIG. 11 is a cutaway side view illustration of the incremental weight device mounted inside an exercising apparatus.

Referring now to FIGS. 9 and 10, the principal advantage of the preferred leash system will be described. In both illustrations, the pulling resistance on the leash 28' is represented over the range of the leash. The distance 'C' represents the length of slack segment 150 in the leash. The distance 'D' represents the span corresponding to the vertical measure travelled by the first weight 46, and the distance 'E' represents the span corresponding to the vertical measure travelled by the incremental weight device 50. The vertical measures 'D' and 'E' are similar distances. The different shades of gray in the span 'E' in FIG. 9, and the step-like portion in the span 'E' in the graph of FIG. 10 represent the addition of the weights 70, 72, 74 during the extension of the incremental weight device 50. The heavier shade in FIG. 9 and the last step in the graph of FIG. 10 shows the compression of the spring 142 in the shock absorber 114.

While the length of a rope 'D' between the first weight 46 and the first telescoping weight 70 is somewhat predictable by an animal, the additions of the other telescoping weights 72 and 74 come in rapid succession relative to the distance 'D'. Their additions to the leash's resistance are therefore more difficult to anticipate. For this reason basically, an animal pulling on the preferred leash system generally turns back at the application of the second telescoping weight 72 or the third telescoping weight 74.

Referring particularly to FIG. 9, one can understand that the addition of weights to the leash 28 is effected in an exponential-like manner as shown by curve 152. Such an exponential addition of weight transmits a command of firmness to the leash 28'. It has been found that such command has a dissuading effect on animals. An animal tied to this leash realizes the rapid succession of increases in tension in the region 'E' and soon learns to avoid this region.

Because of the possibility to add load units 90 inside each section of the incremental weight device 50, it is possible to change the slope of the curve 152 to increase the firmness in the leash to work best with the character of the animal to be restrained.

While the incremental weight device 50 according to the present invention has been described in use in an animal leash apparatus, it will be appreciated that this incremental weight device has numerous other applications that are only limited by the imagination of the user. In an attempt to demonstrate these other applications, FIG. 11 has been inserted herein. FIG. 11 illustrates an exercising apparatus 160 that can be used to develop the arms, shoulders and thorax muscles of an athlete for examples.

The exercising apparatus comprises a base 162 which can be bolted to a floor, a vertical hollow column 164 mounted to the base 162, and a cap 166 mounted on the top of the column 164. A rope 168 extends through the cap 166. The rope 168 has a first end outside the column and a handle 170 is attached to that first end. An incremental weight device 172 is mounted inside the column 164. The second end of the rope 168 is attached to the incremental weight device 172. The second incremental weight device 172 differs slightly from the first incremental weight device 50 as previously described because it contains four telescoping sections instead of three. In use, the incremental weight device 172 is extended as the handle 170 is pulled away from the column 164. The pulling resistance on the handle 170 is thereby increased incrementally as the handle is moved away from the column 164.

The person skilled in the art will appreciate that the apparatus illustrated in the drawings can also be used as mooring devices for retaining small boats to a dock for example.

As to other manner of usage and operation of the present invention, the same should be apparent from the above description and accompanying drawings, and accordingly, no further discussion relative to the manner of usage and operation is provided.

While two embodiments of the present invention have been illustrated in the accompanying drawings and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

What is claimed is:

1. An incremental weight device comprising;
    an upper and lower tubular sections extending vertically, said upper tubular section being telescopically mounted inside said lower tubular section and being telescopically movable vertically inside and relative to said lower tubular section between a collapsed position and an extended position;
        said upper and lower tubular sections being contiguous with each other in said collapsed and extended positions;
    means for preventing a separation of said upper tubular section from said lower tubular section in said extended position; and
    each of said upper and lower tubular sections having a removable plug in a lower end thereof and said removable plug having a weight removably mounted therein, wherein said weight in said lower tubular section is heavier than said weight in said upper tubular section.

2. The incremental weight device as claimed in claim 1, further comprising:
    a lowermost tubular section extending vertically;
    said lower tubular section being telescopically mounted inside said lowermost tubular section and being telescopically movable inside and relative to said lowermost tubular section;
    means for preventing separation of said lower tubular section from said lowermost tubular section; and
    said lowermost tubular section having a removable lowermost plug in a lower end thereof and a lowermost weight removably mounted in said removable lowermost plug, wherein said lowermost weight is heavier than said weight in said lower tubular section.

3. The incremental weight device as claimed in claim 1, wherein said means for preventing a separation comprises a shoulder extending radially outwardly from said plug on said lower end of said upper tubular section, and a lip extending radially inwardly from an upper end of said lower tubular section, and said lip and said shoulder having dimensions to interfere with each other in said extended position.

4. The incremental weight device as claimed in claim 1, wherein said upper tubular section has an eyelet on an upper end thereof.

5. The incremental weight device as claimed in claim 3, wherein each of said plugs has a cavity therein, and and each of said weights has a torus shape and is mounted in said cavity.

\* \* \* \* \*